Nov. 12, 1963    F. DOURNOW    3,110,218
ROCKETS CARRIED IN CLUSTERS BY A LAUNCHING MACHINE
AND IN PARTICULAR AN AIRCRAFT
Filed Feb. 23, 1961    2 Sheets-Sheet 1
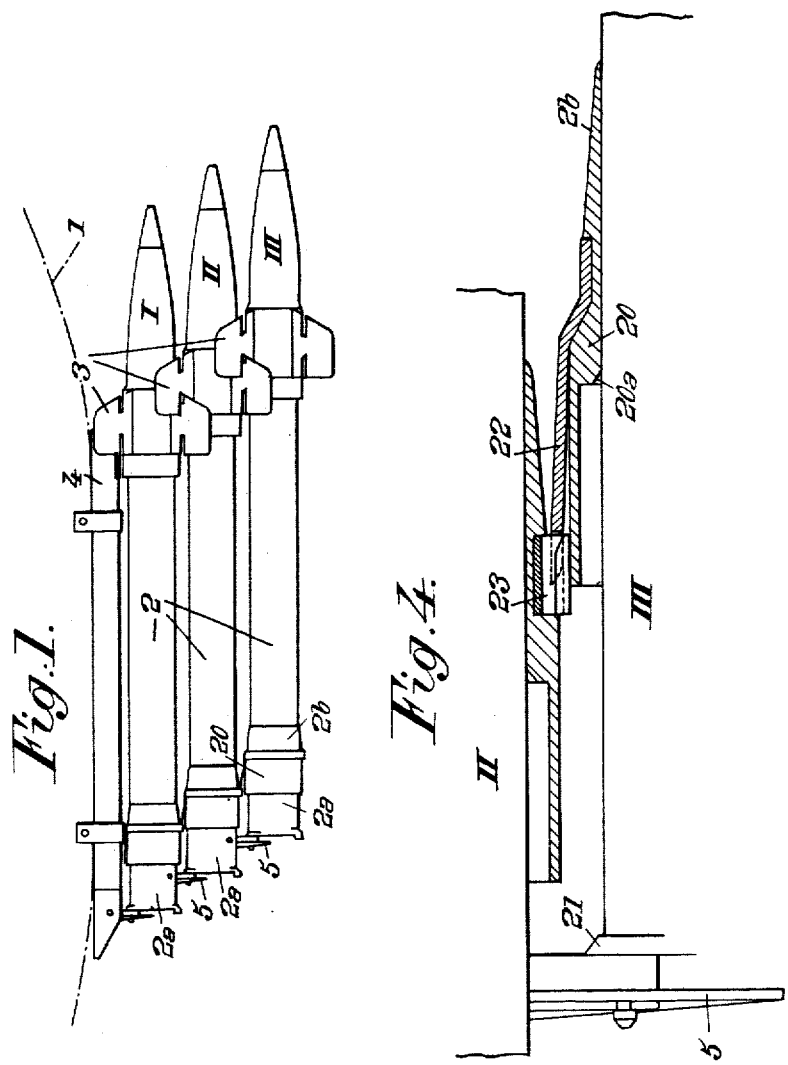
INVENTOR
Frederic Dournow
BY
Lawson and Taylor
ATTORNEY

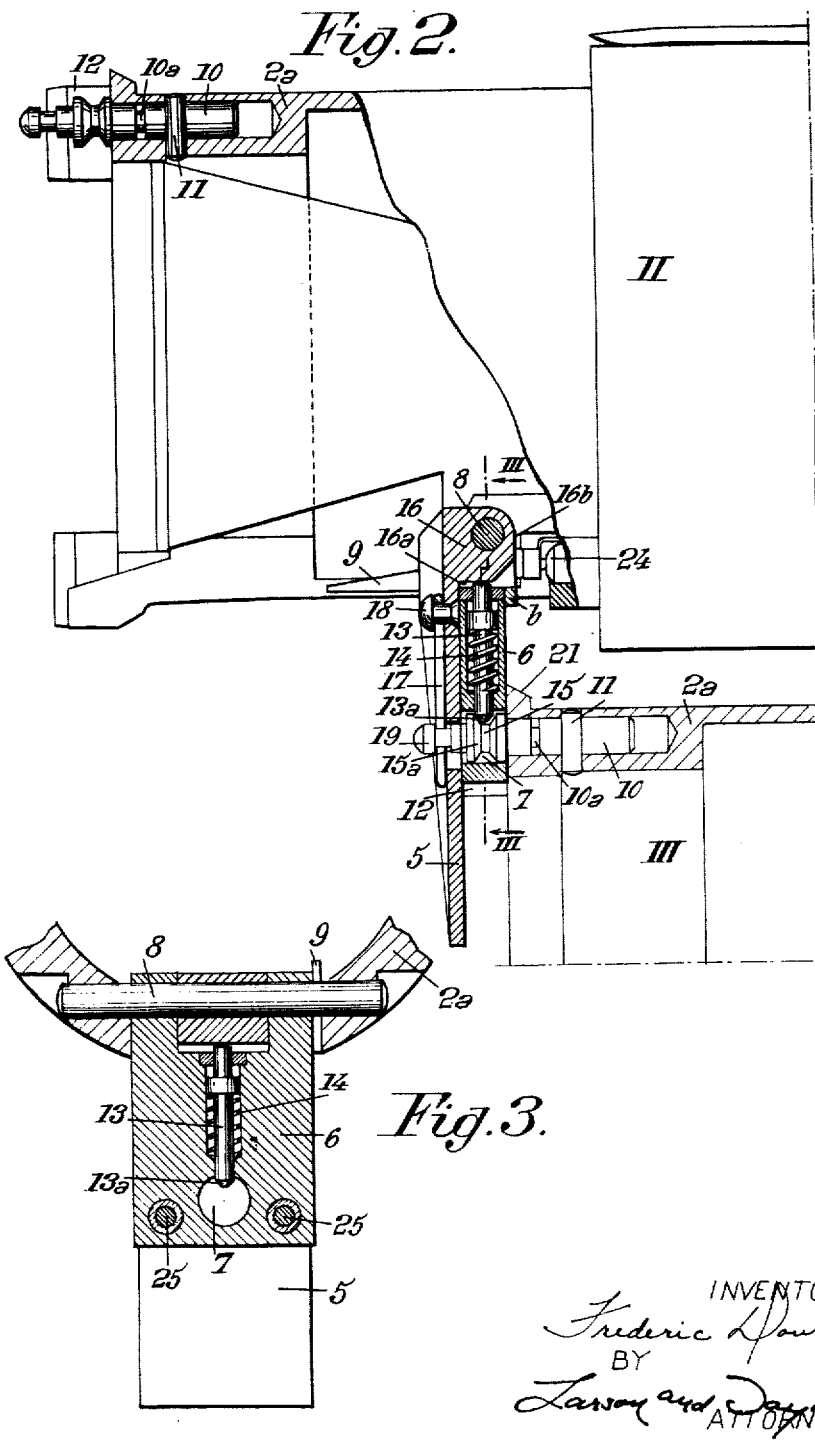

United States Patent Office 3,110,218
Patented Nov. 12, 1963

3,110,218
ROCKETS CARRIED IN CLUSTERS BY A LAUNCHING MACHINE AND IN PARTICULAR AN AIRCRAFT
Frederic Dournow, Geneva, Switzerland, assignor to Brevets Aero-Mecaniques S.A., Geneva, Switzerland, a society of France
Filed Feb. 23, 1961, Ser. No. 91,000
Claims priority, application Luxembourg Feb. 27, 1960
2 Claims. (Cl. 89—1.7)

The present invention relates to rockets carried in clusters by a launching machine and in particular an aircraft.

A cluster of rockets, in the meaning that is given to this term in the present specification, consists of two or more rockets each of which is supported either by another rocket or by an element of said launching machine, with the exception of the last one, and is supporting another rocket, these rockets being intended to be fired successively, the last supported one being the first to be fired.

The chief object of the present invention is to provide a combination of rockets of this kind which is better adapted to meet the requirements of practice than those known up to this time.

In the systems with which this invention is concerned, every rocket carries the two complementary parts (hereinafter called supporting part and supported part) of an assembly device in which said two parts are slidably engaged in each other, said complementary parts being arranged in such manner and occupying relative positions such that a rocket may be supported by another rocket similar thereto while being free to move forwardly with respect to said similar rocket.

The system according to the present invention is characterized in that, on the one hand, one of the complementary parts of the assembly device of every rocket comprises releasable locking means capable, when in active position, and, when this complementary part (either the supporting one or the supported one) of said rocket is in engagement with the other complementary part (either the supported one or the supporting one) of the assembly device of another rocket, of opposing any separation of these two complementary parts from each other and, on the other hand, these locking means are controlled in such manner by a movable element belonging to the supporting rocket and exposed to the action of the propelling jet of the supported rocket (when this last mentioned rocket is to be launched and its propelling charge has been fired) that the displacement of said movable element under the effect of said propelling jet releases said locking means, thus permitting said supported rocket to be launched.

Preferred embodiments of the present invention will be hereinafter described with reference to the accompanying drawings, given merely by way of example and in which:

FIG. 1 diagrammatically shows, in elevational view, a cluster of three rockets according to the invention and suspended to an aircraft wing.

FIG. 2 shows on an enlarged scale and with parts cut away and partly in section, the assembly device connecting two rockets located just above each other.

FIG. 3 is a transverse section view of said assembly device on the line III—III of FIG. 2.

FIG. 4 shows, on an enlarged scale, a detail of the arrangement of FIG. 1.

The cluster of rockets shown by FIG. 1 is suspended under the wing 1 of an aircraft.

Each of the rockets comprises a body 2 the rear end 2a of which contains the nozzle through which escapes the combustion gases of the propelling charge of the rocket.

The rockets are assembled together in the following manner, illustrated by FIG. 1. On the one hand, there is a front assembly device by which the rockets are suspended to each other but which does not exert any axial holding action on every suspended rocket. Such a front assembly device comprises, as shown, a tail unit 3 provided with longitudinal slots so that every tail unit can be engaged in and held by the tail unit of the rocket located immediately above it. The only exception concerns the top rocket I the tail unit 3 of which is carried by a support 4 rigid with wing 1. Every tail unit 3 occupies, before the corresponding rocket is launched, a position near the front end of the rocket, where it acts both as a guide and as a support for the rocket body. When the rocket is being launched, it carries the tail unit along with it, so that said tail unit comes to occupy, by abutment against a frusto-conical portion 2b located at the rear end of the rocket, the position it must keep during the flight of the rocket.

On the other hand, there is provided a rear assembly device acting both as suspension means and as means for axially holding the rocket under normal conditions and releasing it when the charge of the rocket is ignited.

It will be readily understood that it is desirable to have a rear assembly device that is capable of exerting on the rocket an axial holding action as strong as possible as long as the rocket is not fired (in order to avoid any accidental release of the rocket during manoeuvres of the aircraft or when said aircraft is landing) but that on the contrary this holding action must cease in a reliable, complete and practically instantaneous manner when the rocket is fired, so as to offer no resistance to the propelling thrust of the jet of the rocket.

According to the present invention, this result is obtained by the combination of the following features.

The rear portion 2a of every rocket carries the complementary parts (supporting part and supported part) of an assembly device, these complementary parts being arranged and disposed in such manner that it is possible to suspend a rocket III to a rocket II (similar thereto) located immediately above it by engaging, by a relative rearward guiding displacement of the supported rocket III, the supported part of the assembly device of said rocket III with the supporting part of the assembly device of supporting rocket II.

One of the complementary parts of the assembly device of every rocket is provided with releasable locking means capable, when in active position and when this last mentioned complementary part is in engagement with the other complementary of the assembly device of another rocket, of opposing any separation of these two complementary parts from each other.

Said locking means are controlled by a movable element 5 exposed to the action of the propelling jet of that of the two rockets which is the first to be fired (rocket III) in such manner that the displacement of said movable element under the effect of said propelling jet releases said locking means and thus permits the launching of the first rocket to be fired.

Preferably, the locking means and the movable element serving the control said means are associated with the supporting portion of the rear assembly device of the rocket, the movable control element 5 being then arranged so that when it is in active position, i.e. when the rocket that is considered supports a rocket to be fired before it, said movable control element 5 projects from the outline of the supporting rocket and extends across the future trajectory of the propelling jet of the supported rocket.

Preferably also, the system is arranged in such manner that the forces, and in particular the axial forces, acting on the assembly device in operative position are applied exclusively to the cooperating complementary parts of said assembly device, and also to the locking means concerning the axial forces, whereby the movable control element upon which said forces have no action can be made of a high sensitivity and capable of releasing said locking means as soon as the nozzle of the supported rocket start delivering a propelling jet.

As shown by FIGS. 2 and 3, the two complementary parts of the assembly device, i.e. a supporting part which is advantageously a female one and a supported part which is advantageously a male one, are located respectively in diametrically opposed regions of the rear end 2a of the rocket. Preferably the supporting part is located ahead of the supported part, so that when the rockets have been assembled to form a cluster, every rocket located under another one is located slightly forward of it, as shown by FIG. 1.

The female supporting part of the assembly device consists of a plate 6 extending transversely from the rear end 2a of the rocket, this plate 6 being provided with a hole 7 located close to the outer end of said plate to receive the supported part of the assembly device of another rocket III to be suspended to said rocket II.

Plate 6 is pivoted to the rocket end 2a about a transverse axis 8 so that plate 6 can be pivoted rearwardly, for instance under the effect of the relative wind when the rocket that is considered becomes the first one to be fired, from its active position (shown by FIG. 2) where it is in abutment contact toward the front with an abutment b to a retracted position in a housing provided for this purpose in the rear portion 2a of rocket 2. In this retracted position, plate 6 is maintained by a lateral spring plate 9 which opposes only a low resistance so that it is possible to disengage plate 6 from its retracted position to bring it into active position when it is desired to suspend another rocket to the rocket II that is considered.

The male supported part of the assembly device consists of a pin 10 extending in the longitudinal direction and fitted in the wall of the rear portion 2a of rocket III, this pin 10 being secured in said wall by a key 11. The rear end of pin 10 projects rearwardly from the rear end 2a of rocket III and is dimensioned to engage with some play in the hole 7 provided in the plate 6 of the supporting rocket II.

The releasable locking means for securing the plate 6 of the supporting rocket II to the pin 10 of a supported rocket III are arranged in such manner that, in active position, they not only keep said pin 10 engaged in the hole 7 of plate 6 but also exert on said pin a rearwardly directed force which keeps the supported rocket III applied by its rear edge against the front face of the plate 6 of supporting rocket II.

This arrangement eliminates any axial play in the assembly of the rocket and thus reduces the risks of accidental breaking of the assembly device during the flight of the aircraft.

The rigidity of the whole in the transverse direction may be further increased by providing on the rear edge of every rocket, on either side of the projecting portion of pin 10, lateral abutments 12 between which the plate 6 of a supporting rocket is fitted.

The locking means consists of a locking member or finger 13 housed in plate 6 and adapted to project, against the action of a return spring 14, into the hole 7 of said plate so as to bear, through its ends 13a (preferably of frusto-conical shape) against the oblique rear wall 15a of a groove 15 provided in the projecting portion of the pin 10 engaged in plate 6. Control means are provided to apply the end 13a of finger 13 strongly against the inclined rear wall 15a of groove 15.

This control means consists of a pivoting cam 16 pivoted about axis 8 and having two rectilinear active edges 16a and 16b perpendicular to each other and capable of cooperating with the end of finger 13 opposed to the above mentioned end 13a. The edge 16a is at a distance from axis 8 such that it compels the end 13a of finger 13 to penetrate into the groove 15 of pin 10. The edge 16b is at a distance smaller than the preceding one (from axis 8) such that when said edge 16b is brought opposite finger 13, said finger is pushed out, by its return spring 14, from the orifice 7 in which pin 10 is engaged.

Thus, when cam 16 is in active position as illustrated by FIG. 2, the edge 16a of cam 16 keeps finger 13 engaged in groove 15 with the end 13a of said finger applied against the oblique rear wall 15a of said groove. On the contrary, when cam 16 is in its position of rest after having pivoted through 90° toward the rear so that its edge 16b is located opposite finger 13, this finger is retracted upwardly by spring 14, thus releasing pin 10 and the whole of the assembly device so that finger 13 can slide forwardly through the hole 7 of plate 6 when the supported rocket 3 is launched.

The movable control element 5 of supporting rocket II, which is exposed to the action of the propelling jet of supported rocket III consists of a mere pivoting flap mounted on axis 8, this flap being integral with cam 16. Flap 5 can thus move, by a pivoting movement of 90° toward the rear, from an active position (shown by FIG. 2), where cam 16 is in locking position and flap 5 is applied against plate 6 and extends beyond it across the trajectory of the jet which is to issue from supporting rocket III, to a position of rest where cam 16 is in releasing position and flap 5 is retracted in the rear part 2a of rocket II and kept in this position by plate 6 after said plate has been retracted. Releasable resilient locking means are provided to keep the flap 5 of a supporting rocket II in active position until the supporting rocket III is fired. Said locking means consist of a hair pin spring wire 17 fixed at one of its ends to the rear face of flap 5, for instance by means of a rivet 18, and adapted to engage under an enlarged projection 19, formed at the end of pin 10 and extending through a hole of flap 5, when said flap is applied against plate 6.

Under the effect of the propelling jet from supported rocket III, flap 5 is pushed towards the rear so as to overcome the resistance of spring 17 engaged under projection 19. For the sake of safety, pin 10 has a portion 10a of restricted cross-section so as to break under the effect of the force applied to said pin if flap 5 remained accidentally wedged in active position.

The system works in the following manner. When the supported rocket III is fired, the propelling jet thereof pushes flap 5 rearwardly, overcoming the resistance of spring 17. Cam 16 is thus caused to rotate through 90°, releasing finger 13, which under the action of spring 14 pushed out from the groove 15 of the pin 10 of supported rocket III. This last mentioned rocket is thus free to start forwardly under the action of its propelling jet. Once rocket III has been launched, the plate 6 of the supporting rocket is retracted by the relative wind. Thus the first rocket to be launched is released practically as soon as its propelling charge is ignited, and even before its propelling jet has reached its full thrust.

It is advantageous, in order to steady the position of the last rocket as it is being released, to provide, in addition to the front guiding means, complementary guiding means acting on the rear portion of said last rocket during the very short time elapsing before its propelling jet has become sufficiently strong to give it a steady acceleration. Such complemetnary guiding means as shown by FIGURE 4. They comprise, mounted on the rear portion of the body of the rocket, a sliding sleeve 20 the front of which is preferably arranged so as to constitute the frusto-conical part 2b intended to engage into the rocket tail unit 3 and to carry it along. Holding means yieldably connected with the next supporting rocket (rocket II) are provided to keep sleeve 20 in the positon shown by FIGURE 4 until a rear abutment 21 rigid with the body of the launched rocket III engages said sleeve 20 and drives it along together with rocket III. This rear abutment 21 is preferably frusto-conical and adapted to fit into a corresponding housing 20a, provided in sleeve 20.

The means for releasably holding sleeve 20 carried by the supported rocket III are made as follows. Sleeve 20 carries a resilient plate or strip 22 having a forked end the branches of which resiliently engage, on opposite sides thereof, the vertical stem of an inverted T-shaped holding member 23 carried by the supporting rocket III. Sleeve 20 is held by member 23 in the position shown by FIG. 4 until abutment 21 comes to strike housing 20a. Strip 22 is then detached from holding member 23.

The guiding length therefore corresponds to the distance between abutment 21 and housing 20a.

Finally, it should be noted that if the system for firing the rockets comprises at least one or preferably two electric circuits, extending through the cluster of rockets and if only the firing means of the first rocket to be launched are in a position to be operated, owing to the active position given to switch 24 (such an arrangement being shown in the Belgian Patent No. 575,391), plate 6 is advantageously used in the following manner.

On the one hand, when it is in active position, it connects contact 25 mounted thereon with a corresponding contact carried by the rear edge of the next rocket thus closing the two electric circuits from the supporting rocket to the supported rocket (if there are two such circuits); on the other hand, when the last supported rocket III is fired, the plate 6 of the supporting rocket II pivoting through an angle of 90° towards the rear, places switch 24 in active position.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In a rocket system including a support; at least one supporting rocket and one supported rocket, the supported rocket having no direct connection with the support, the said rockets being elongate and parallel and having rear nozzles; holding means detachably securing the supported rocket to the support; and guiding means carried by the supporting rocket at the front portion thereof for supporting the supported rocket at its front portion and guiding the supported rocket in a direction parallel to the longitudinal axes of both of the rockets; an assembly device comprising, in combination:

a pin parallel to the longitudinal axes of the rockets fixed to the rear end of the supported rocket and projecting beyond the said rear end;

a plate pivoted to the supporting rocket at the periphery of the rear portion thereof about an axis perpendicular to the longitudinal axis of the supporting rocket;

a locking member slidable in said plate in a direction toward said pin and perpendicular to said pivoting axis, said locking member and pin each defining releasable complementary means for interengagement to fix the plate with respect to said pin;

a control flap pivoted to said supporting rocket about an axis perpendicular to the longitudinal axis of the supporting rocket and having an active position wherein the flap extends perpendicularly to said longitudinal axis of the supporting rocket and projects behind the rear nozzle of the supported rocket, the said flap defining means preventing sliding of the locking member away from said pin and keeping said member and said pin interengaged when said flap is in the active position;

resilient means interposed between said slidable locking member and said plate for urging and moving said locking member away from the pin when the flap is not in its active position; and yielding means interposed between the flap and the pin for holding the flap in the active position, the yielding means being overcome by a jet stream emerging from the supported rocket rear nozzle and enabling said flap to pivot from the active position in response to the jet stream and subsequently enabling the resilient means to move the locking member away from interengagement with the pin.

2. In a rocket system including a support; at least one supporting rocket and one supported rocket, the supported rocket having no direct conection with the support, the said rockets being elongate and parallel and having rear nozzles; holding means detachably securing the supported rocket to the support; and guiding means carried by the supporting rocket at the front portion thereof for supporting the supported rocket at its front portion and guiding the supported rocket in a direction parallel to the longitudinal axes of both of the rockets; an assembly device comprising, in combination:

a pin parallel to the longitudinal axes of the rockets fixed to the rear end of the supported rocket and having a portion projecting beyond the said rear end, the pin defining an annular groove in the projecting portion;

a plate pivoted to the supporting rocket at the periphery of the rear portion thereof about an axis perpendicular to the longitudinal axis of the supporting rocket, the plate including edge means defining a hole receiving the projecting portion of the pin;

a locking finger slidable within the plate in a direction toward said hole and pin and perpendicular to the said pivoting axis, the finger at one end engaging the pin at the annular groove to fix the plate with respect to said pin;

a control flap pivoted to the supporting rocket about an axis perpendicular to the longitudinal axis of the supporting rocket and having an active position wherein the flap extends perpendicularly to the said longitudinal axis and projects behind the rear nozzle of the supported rocket, the flap defining a cam surface rigid therewith engaging the finger at the other end to retain the finger in engagement with the pin when the flap is in the active position and to permit movement of the finger out of engagement with the pin when the flap is out of the active position;

resilient means interposed between the locking finger and the plate for urging and moving the locking finger away from the pin and groove when the movement of the finger is permitted; and yielding means interposed between the flap and the pin for holding the flap in the active position, the yielding means being overcome by a jet stream emerging from the supported rocket rear nozzle and enabling said flap to pivot from the active position in response to the jet stream and subsequently enabling the resilient means to move the locking finger away from engagement with the pin and permit pivoting of the plate.

References Cited in the file of this patent

UNITED STATES PATENTS

| 2,968,222 | Meier | Jan. 17, 1961 |

FOREIGN PATENTS

| 130,841 | Sweden | Feb. 13, 1951 |
| 1,211,023 | France | Oct. 5, 1959 |

UNITED STATES PATENT OFFICE
CERTIFICATE OF CORRECTION

Patent No. 3,110,218 November 12, 1963

Frederic Dournow

It is hereby certified that error appears in the above numbered patent requiring correction and that the said Letters Patent should read as corrected below.

Column 5, line 50, for "supported" read -- supporting --.

Signed and sealed this 21st day of December 1965.

(SEAL)
Attest:

ERNEST W. SWIDER
Attesting Officer

EDWARD J. BRENNER
Commissioner of Patents